United States Patent [19]

Felix

[11] Patent Number: 5,276,906
[45] Date of Patent: Jan. 4, 1994

[54] RADIOTELEPHONE SYSTEM INCORPORATING TWO THRESHOLDS FOR HANDOFF

[75] Inventor: Kenneth A. Felix, Crystal Lake, Ill.

[73] Assignee: Motorola, Inc., Schaumburg, Ill.

[21] Appl. No.: 46,469

[22] Filed: Apr. 13, 1993

Related U.S. Application Data

[63] Continuation of Ser. No. 588,771, Sep. 27, 1990, abandoned.

[51] Int. Cl.5 .......................... H04Q 7/04; H04Q 9/00
[52] U.S. Cl. .................... 455/33.2; 455/54.2; 379/60
[58] Field of Search ............ 455/33.2, 33.4, 54.2; 379/59, 60, 63

[56] References Cited

U.S. PATENT DOCUMENTS

| | | |
|---|---|---|
| 3,328,698 | 6/1967 | Schreder . |
| 3,898,390 | 8/1975 | Wells et al. . |
| 3,906,166 | 9/1975 | Cooper et al. . |
| 3,913,017 | 10/1975 | Imaseki ..................... 455/33 |
| 4,475,010 | 10/1984 | Huensch et al. ............ 379/60 |
| 4,485,486 | 11/1984 | Webb et al. . |
| 4,556,760 | 12/1985 | Goldman . |
| 4,670,906 | 6/1987 | Thro ........................ 455/33 |
| 4,696,027 | 9/1987 | Bonta . |
| 4,704,734 | 11/1987 | Menich et al. ............. 379/60 |
| 4,718,081 | 1/1988 | Brenig . |
| 4,775,995 | 10/1988 | Chapman et al. ........... 455/54 |
| 4,794,635 | 12/1988 | Hess . |
| 4,811,380 | 3/1989 | Spear . |
| 5,067,171 | 11/1991 | Kawano ..................... 455/33 |

FOREIGN PATENT DOCUMENTS

0210792 2/1987 Japan ........................... 455/33
0092528 4/1987 Japan ........................... 455/33

OTHER PUBLICATIONS

EIA/TIA, Project No. 2215, Dual-Mode Mobile Station-Base Station Compatibility Standard, Dec., 1989, pp. 2-75 to 2-79–describes the process a mobile undergoes to determine candidate target base-sites.

*Primary Examiner*—James L. Dwyer
*Assistant Examiner*—Timothy H. Keough
*Attorney, Agent, or Firm*—Richard A. Sonnentag; Raymond Jenski

[57] ABSTRACT

A digital radiotelephone system requiring a transfer of communication from a source base-site (200) in a source cell (100) to a selected one target base-site in a target cell. A source base-site (200) in the source cell (100) provides a first and a second threshold and measures the received signal strength of a mobile unit (225) communicating to the source base-site (200). When the measured signal strength at the source base-site (200) falls below the first threshold, the source base-site (200) initiates a handoff to target base-sites located by the mobile unit (225). The target base-sites measure the received signal strength of the mobile unit (225) and a target base-site is selected. The source base-site (200) is notified of the selected target base-site and hands off communication of the mobile unit (225) to the selected target base-site when the previously measured signal strength at the source base-site (200) falls below the second threshold.

14 Claims, 3 Drawing Sheets

RADIOTELEPHONE SYSTEM INCORPORATING TWO THRESHOLDS FOR HANDOFF

This is a continuation of application Ser. No. 07/588,771, filed Sep. 27, 1990 and now abandoned.

FIELD OF THE INVENTION

This invention relates generally to cellular radiotelephone systems, and more particularly to cellular radiotelephone systems requiring communication transfer for call maintenance.

BACKGROUND OF THE INVENTION

In cellular radiotelephone systems, handoff of a mobile is required to maintain communication to the mobile as it moves from cell to cell in the system. Handoff can be defined as the process of transferring a call in progress from one RF coverage area to another in coordination with the movement of the mobile. It is also the process whereby a call is transferred to another channel within a RF coverage area because of interference within the coverage area. The process of handing off a call in progress is one of the most delicately balanced functions related to cellular radiotelephone systems because it requires a high level of coordination among the various system processing elements to ensure successful operation. Failure to hand a call off at the proper time generally results in a reduction in the call quantity, interference with neighboring coverage areas and even the undesired termination of the call.

Current analog cellular radiotelephone systems require that the system continuously monitor the quality of every call which is operational on the system. The system must recognize when the quality of a call falls below a predetermined threshold in a particular coverage area and must also determine what other coverage area can satisfactorily handle the call. Once a more suitable coverage area is identified, the system sends instructions to the mobile directing it to another channel. The mobile confirms that it is leaving its current channel, tunes to the new channel, synchronizes to the new channel and begins transmitting thereby confirming that it has arrived on the new channel.

In digital cellular radiotelephone systems, the procedure is modified somewhat in that the mobile is capable of measuring other channels as instructed by the system as well as its current channel and also that the mobile reports this information back to the system. These measurements consist of signal strength only and are relative as the measured results are likely to vary considerably due to varying environmental conditions. Because of this and because the mobile cannot determine if the measurement is that of an interferer or the correct channel, the system must scan for the mobile in the cell selected by the mobile.

Although in digital cellular communications systems the mobile is capable of measuring other channels and reporting back to the system, the scan the target cells perform still occurs after the quality of the call has fallen below a predetermined handoff level in a particular coverage area. Thus, by using the mobile to determine target cell candidates, the number of candidate target cells is decreased but no improvement on call quality during handoff is made.

Thus, a need exists for a handoff procedure which will initialize the handoff procedure before the predetermined handoff threshold.

SUMMARY OF THE INVENTION

A radiotelephone system requiring a transfer of communication from a source base-site to a selected one target base-site, the source base-site providing a first and second threshold is disclosed. The system provides a first and second threshold associated with the source base-site and obtains a first signal quality value of a signal received by the source base-site. The system obtains a second signal quality value of said signal received by the selected one target base-site and sends a communication transfer request to at least the selected one target base-site when said first signal quality value is less than said first threshold. A transfer of communication from the source base-site to the selected one target base-site takes place in response to said communication transfer request when said second signal quality value is greater than said first signal quality value. A transfer of communication from the source base-site to the selected one target base-site takes place when said first signal level quality value is less than said second threshold.

DESCRIPTION OF A PREFERRED EMBODIMENT

Figure 1:
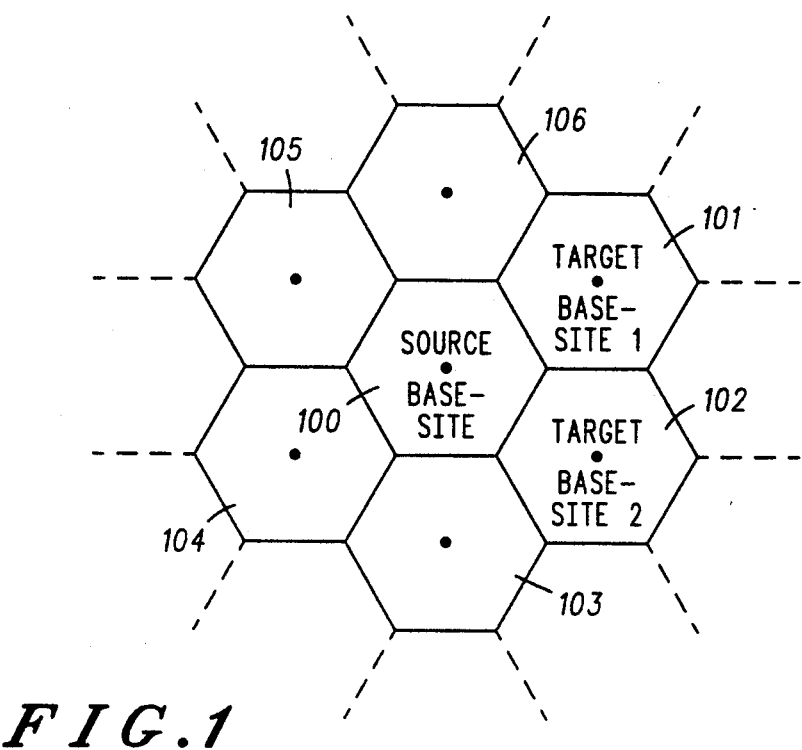
FIG. 1 generally depicts an idealized geographic layout of a digital radiotelephone system.

A typical configuration in a cellular communication system is shown in FIG. 1. A source cell 100 contains a source base-site and is bounded by target cells 101 through 106 containing six separate target base-sites. The source cell 100 contains the mobile unit that is traveling with the boundary of the source cell 100.

Figure 2:
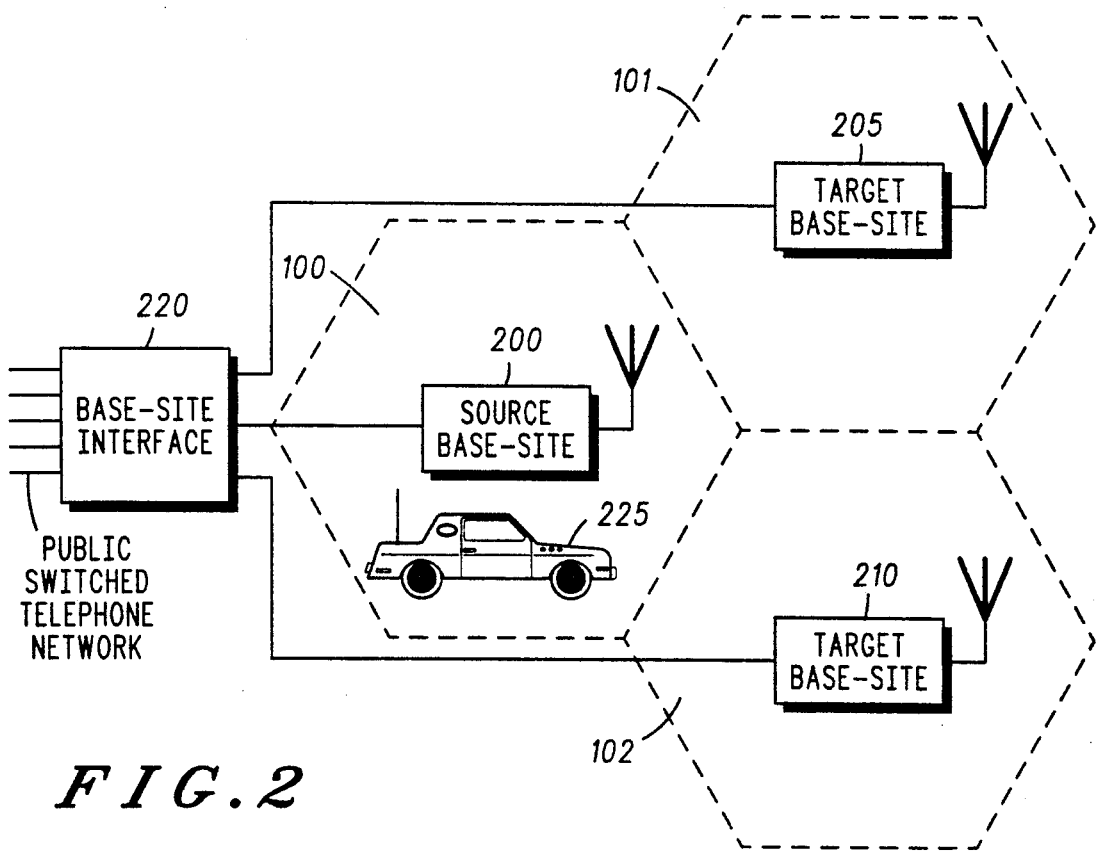
FIG. 2 depicts a mobile unit communicating to a source base-site and moving toward two candidate target base-sites.

FIG. 2 shows a magnified view of the source cell 100 and potential target cells 101 and 102. The source base-site 200 and the target base-sites 205 and 210 are coupled together through the base-site interface 220. The base-site interface 220 has input lines from the public switched telephone network. The mobile unit 225 communicates to the source base-site 200 throughout the boundary of the source cell 100 and moves toward target cells 101 and 102.

Figure 3A:
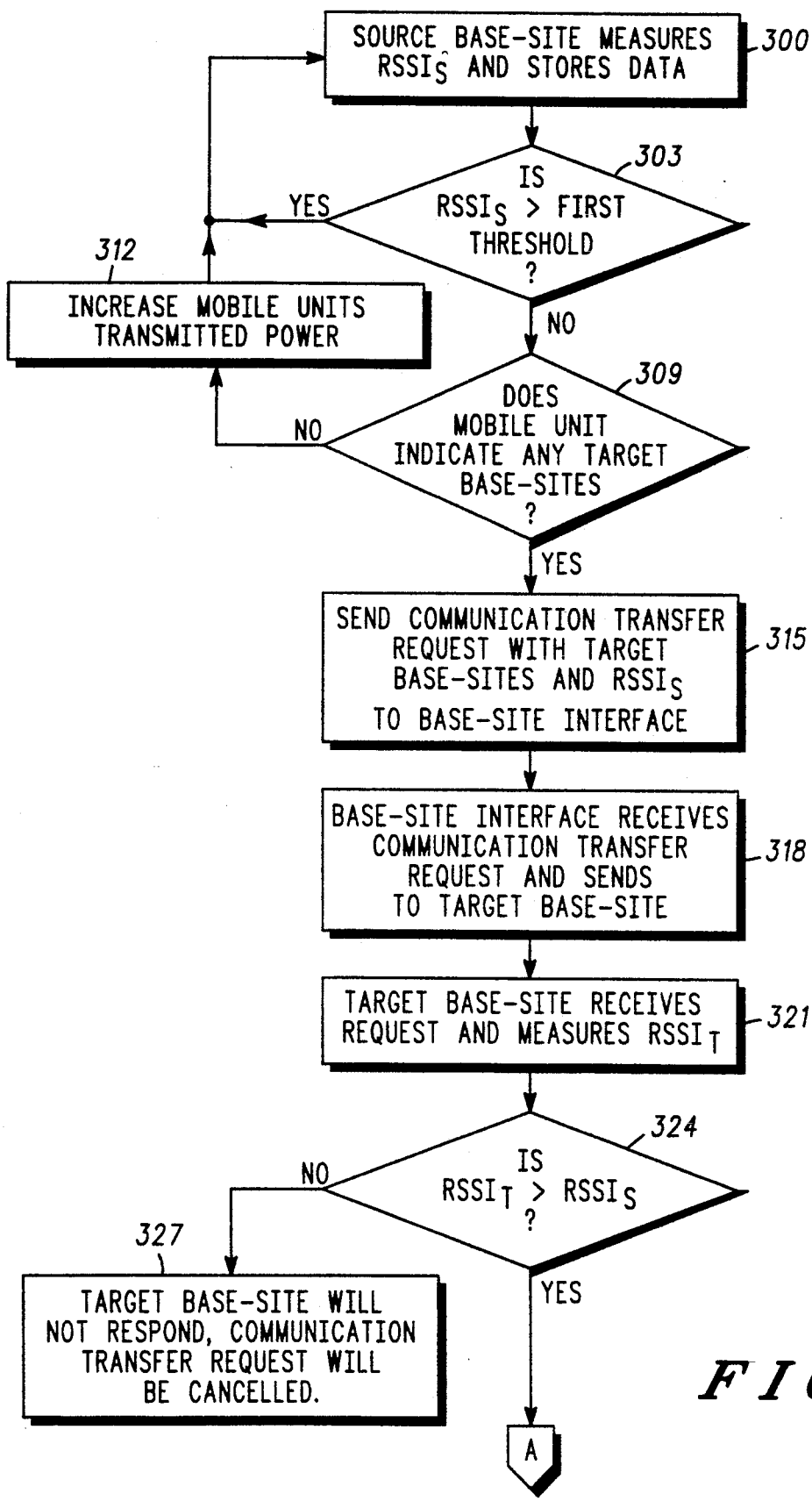
FIG. 3A and 3B are a flow diagram of the steps the digital radiotelephone system takes to transfer communication of the mobile unit in accordance with the invention.
Figure 3B:
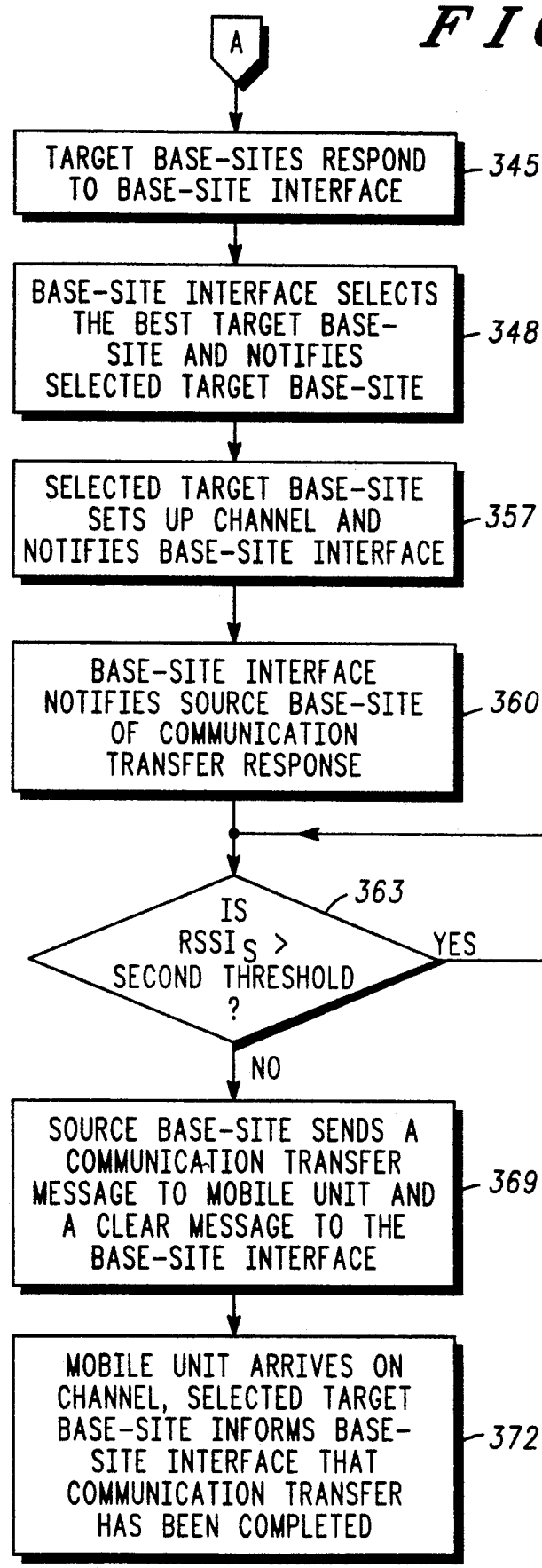

FIG. 3 is a flow diagram of the handoff or communication transfer process the system undergoes as the mobile unit 225 moves away from the source base-site 200 to which it is communicating. The source and target base-sites use a signal quality value, a received signal strength indication (RSSI) in the preferred embodiment, to initiate and complete a communication transfer. The source base-site 200 measures a first signal quality value ($RSSI_S$) and stores at 300 the data. A test is then performed at 303 to determine if $RSSI_S$ is greater than a first threshold. If $RSSI_S$ is greater, the source base-site 200 will continue to measure $RSSI_S$ and store the data. If $RSSI_S$ is not greater than the first threshold, a test is performed at 309 to determine if the mobile unit 225, which has been monitoring for potential target base-sites, has indicated any target base-sites. If no target base-sites were found by the mobile unit 225, the transmitted power of the mobile unit 225 is increased at 312 and the source base-site 200 continues to measure $RSSI_S$ and store at 300 the data. If the mobile unit 225 does indicate target base-sites, a communication transfer request including the target base-site information and $RSSI_S$ is sent at 315 to the base-site interface 220. The base-site interface 220 receives the communication transfer request and sends at 318 the information contained in the request to all target base-sites located by the mobile unit 225. The target base-sites receive the message and measures at 321 a second signal quality value ($RSSI_T$) of the mobile unit 225. A test is then performed at 324 to determine if $RSSI_T$ is greater than $RSSI_S$ plus a hysteresis value. The hysteresis value is a value predetermined by the system designer which accounts for the different physical locations of the source and target base-sites, and can be positive, negative or zero. If $RSSI_T$ is not greater than $RSSI_S$ plus the hysteresis value, the target base-sites will not respond and the communication transfer request will be cancelled at 327. If $RSSI_T$ is greater than $RSSI_S$ plus the hysteresis value, a response is sent at 345 to the base-site interface 220 from the target base-sites located by the mobile unit 225.

After target base-sites respond to the base-site interface 220, the base-site interface 220 selects the best target base-site and notifies at 348 the selected target base-site. The selected target base-site sets up a channel and notifies at 357 the base-site interface 220 which then notifies at 360 the source base-site 200 of the communication transfer response. A test is then performed at 363 to determine if $RSSI_S$ is greater than the second threshold. If $RSSI_S$ is greater than the second threshold, the test at 363 is repeated. If $RSSI_S$ is not greater than the second threshold, the source base-site 200 will send at 369 a communication transfer message to the mobile unit 225 and a clear message to the base-site interface 220. The mobile unit 225 tunes to the new channel and the target base-site tells at 372 the base-site interface 220 that the mobile is being received. Communication transfer of the mobile unit 225 from the source base-site 200 to the selected target base-site has been completed.

What is claimed is:

1. A radiotelephone system requiring a communication transfer from a source base-site to a selected one target base-site, comprising:
   means for providing a first threshold and a second threshold each associated with the source base-site;
   means for obtaining a first signal quality value of a signal received by the source base-site;
   means for obtaining a second signal quality value of said signal received by at least the selected one target base-site;
   means for sending a communication transfer request to at least the selected one target base-site when said first signal quality value is less than said first threshold;
   means, at the selected target base-site and coupled to said means for sending, for responding to the source base-site when said second signal quality value is greater than said first signal quality value; and
   means, coupled to said means for responding, for transferring communication from the source base-site to the selected one target base-site when said first signal level quality value is less than said second threshold.

2. The radiotelephone system of claim 1 wherein said means for sending said communication transfer request further comprises means for including said first signal quality value in said communication transfer request.

3. The radiotelephone system of claim 1 wherein said means for transferring communication from the source base-site to the selected one target base-site when said first signal level quality value is less than said second threshold further comprises means for transferring communication from the source base-site to the selected one target base-site when said second signal quality value is greater than said first signal quality value and when said means for responding responds.

4. The radiotelephone system of claim 1 wherein said means for obtaining a first signal quality value further comprises means for providing a hysteresis value correlating the physical locations of the source base-site and at least the selected one target base-site.

5. The radiotelephone system of claim 4 wherein said means for responding to the source base-site when said second signal quality value is greater than said first signal quality value further comprises means for responding to the source base-site when said second signal quality value is greater than said first signal quality value plus said hysteresis value.

6. A radiotelephone system having a mobile unit communicating to a source base-site, the mobile unit requiring a transfer of communication from the source base-site to a selected one target base-site, the radiotelephone system comprising:
   means for providing a first threshold and a second threshold each associated with the source base-site;
   means, at the source base-site, for obtaining a first signal quality value of the mobile unit communicating with the source base-site;
   means, at the source base-site, for receiving information from the mobile unit;
   means, at at least the selected one target base-site, for obtaining a second signal quality value of the mobile unit communicating with the source base-site;
   means, coupled to said means for obtaining a first signal quality value, for providing a hysteresis value correlating the physical locations of the source base-site and at least the selected one target base-site;
   means for comparing said first signal quality value to said first threshold and for comparing said first signal quality value to said second threshold;
   means, coupled to said means for receiving, for sending said first signal quality value to at least the selected one target base-site when said first signal quality value is less than said first threshold;
   means, at at least the selected one target base-site, for responding to the source base-site when said second signal quality value is greater than said first signal quality value plus said hysteresis value; and
   means, coupled to said means for responding, for transferring communication from the source base-site to the selected one target base-site when said first signal quality value is less than said second threshold.

7. The radiotelephone system of claim 6 wherein said means for receiving information from the mobile unit further comprises means for receiving an identification of at least one target base-site for communication transfer.

8. A method of communication transfer from a source base-site to a selected one target base-site in a radiotelephone system comprising the steps of:

providing a first threshold and a second threshold each associated with the source base-site;

obtaining a first signal quality value of a signal received by the source base-site;

obtaining a second signal quality value of said signal received by at least the selected one target base-site;

sending a communication transfer request when said first signal quality value is less than said first threshold;

responding to the source base-site when said second signal quality value is greater than said first signal quality value; and transferring communication from the source base-site to the selected one target base-site when said first signal level quality value is less than said second threshold.

9. The method of claim 8 wherein said step of sending said communication transfer request further comprises the step of including said first signal quality value in said communication transfer request.

10. The method of claim 8 wherein said step of transferring communication from the source base-site to the selected one target base-site when said second signal quality value is greater than said first signal quality value further comprises the step of maintaining communication on the source base-site when said second signal quality value is less than said first signal quality value.

11. The method of claim 8 wherein said step of obtaining a first signal quality value further comprises the step of providing a hysteresis value correlating the physical locations of the source base-site and at least the selected one target base-site.

12. The method of claim 11 wherein said step of transferring communication from the source base-site to the selected one target base-site when said second signal quality value is greater than said first signal quality value further comprises the step of transferring communication from the source base-site to the selected one target base-site when said second signal quality value is greater than said first signal quality value plus said hysteresis value.

13. A method of communication transfer in radiotelephone system having a mobile unit communicating to a source base-site, the mobile unit requiring a transfer of communication from the source base-site to a selected one target base-site, the method comprising the steps of:

providing a first threshold and a second threshold each associated with the source base-site;

obtaining, at the source base-site, a first signal quality value of the mobile unit communicating with the source base-site;

receiving, at the source base-site, information from the mobile unit;

obtaining, at at least the selected one target base-site, a second signal quality value of the mobile unit communicating with the source base-site;

providing a hysteresis value correlating the physical locations of the source base-site and at least the selected one target base-site;

comparing said first signal quality value to said first threshold and comparing said first signal quality value to said second threshold;

sending said first signal quality value to at least the selected one target base-site when said first signal quality value is less than said first threshold;

responding to the source base-site when said second signal quality value is greater than said first signal quality value plus said hysteresis value; and transferring communication from the source base-site to the selected one target base-site when said first signal quality value is less than said second threshold.

14. The method of claim 13 wherein said step of receiving information from the mobile unit further comprises the step of receiving an identification of at least one target base-site for communication transfer.

* * * * *